United States Patent [19]

Boonstra et al.

[11] 4,301,042

[45] Nov. 17, 1981

[54] RESISTANCE MATERIAL

[75] Inventors: Alexander H. Boonstra; Cornelis A. H. A. Mutsaers, both of Eindhoven, Netherlands

[73] Assignee: U.S. Philips Corporation, New York, N.Y.

[21] Appl. No.: 127,348

[22] Filed: Mar. 5, 1980

[30] Foreign Application Priority Data

Mar. 8, 1979 [NL] Netherlands .......................... 7901864

[51] Int. Cl.[3] .............................................. B32B 9/04

[52] U.S. Cl. .................................... 252/521; 252/518; 428/432; 423/593; 174/137 B

[58] Field of Search ................ 252/518; 428/539, 432; 423/593

[56] References Cited

U.S. PATENT DOCUMENTS

| | | | |
|---|---|---|---|
| 3,553,109 | 11/1971 | Hoffman | 423/593 |
| 3,681,262 | 8/1972 | Bouchard | 252/521 |
| 4,107,387 | 8/1978 | Boonstra et al. | 428/539 |

*Primary Examiner*—George F. Lesmes
*Assistant Examiner*—E. Rollins Buffalow
*Attorney, Agent, or Firm*—Marc D. Schechter

[57] ABSTRACT

A resistance material comprising a mixture of a permanent binder, a temporary binder and a bismuth-strontium rhodate having a composition defined by the formula $Bi_xSr_{1-x}Rh_{2.5}O_{5-5.5}$ wherein $\frac{1}{2}>x>O$ as a resistance determining component. This component has a linear positive temperature coefficient of resistance (TCR). A resistor having a very low TCR may be made using a mixture of this resistance-determining material with a resistance-determining component having a negative TCR. The resistor is produced by firing this resistance material on a substrate.

9 Claims, No Drawings

RESISTANCE MATERIAL

BACKGROUND OF THE INVENTION

The invention relates to a resistance material comprising a mixture of a permanent binder, a temporary binder and a resistance-determining component which is a metal rhodate. The invention also relates to a resistor having a resistor body provided with leads, the resistor body having been produced by heating a substrate bearing such a resistance material so as to remove the temporary binder.

Such a resistance material is described in UK Pat. No. 1,535,139 (U.S. Pat. No. 4,107,387) in which the resistance-determining component is a metal rhodate having a composition defined by the formula $M_3Rh_7O_{15}$, M preferably being Pb or Sr.

Compared to many oxidic compounds previously suggested for use as the resistance-determining component in resistance materials, this compound has the advantage that it is a completed-reaction product which, with a permanent binder and, possibly, together with another resistance-determining component having a different temperature dependence of resistance, can be processed in a simple manner on a suitable substrate to form a resistor body. Prior to the development of these resistance-materials, resistance pastes were available in which the resistance-determining component was not obtained until the paste had been fired on a substrate, a noble metal oxide reacting during the firing process with a vitreous binder, for example a lead oxide glass, which noble metal oxide and vitreous binder were present in the paste. This required a rather long firing time (for example, half an hour) at a relatively high temperature (approximately 800° C.).

A further advantage of the above mentioned $M_3Rh_7O_{15}$ materials is the small negative temperature coefficient of resistance (TCR) of these materials, which temperature behavior is rare. Combining one of these materials with a material having a linear, positive temperature coefficient of resistance (which materials are much commoner than negative TCR materials) makes it possible to produce resistors having a very low TCR ($|TCR|<100\times10^{-6}|$°C. in a temperature range from $-100°$ to $+200°$ C.).

SUMMARY OF THE INVENTION

The invention provides resistance-determining components having a linear, positive TCR which can be used in combination with a resistance-determining material having a linear negative TCR to form resistors having a low TCR $TCR<100\times10^{-6}|$°C.) in the range from $-100°$ to $+200°$ C.

The resistance material according to the invention is characterized in that the resistance-determining component is predominantly a bismuth-strontium rhodate having a composition defined by the formula $Bi_xSr_{1-x}Rh_{2.5}O_{5\text{-}5.5}$, wherein $\frac{1}{2}>x>0$. The compounds have a hexagonal structure with an a-axis of 14.15 Å and a c-axis of 3.05 Å. The oxygen content of the compounds is between 5 and 5.5 depending on the ratio of Bi:Sr, which have a different valencies. The Sr content can be very high, for example up to nearly 100 mole %. In the above-mentioned formula x preferably satisfies $0.45>x>0.05$.

Surprisingly, it was found that these compounds, which have a completely different crystal structure and a completely different elementary cell from the above-mentioned $M_3Rh_7O_{15}$, compounds have a positive linear TCR.

A further advantage of the $Bi_xSr_{1-x}Rh_{2.5}O_{5\text{-}5.5}$ compounds is that they form long acicular crystals. These needles will be distributed randomly when the resistor body is formed therefrom. The contact area of material having such a structure is much smaller than, for example, the contact area of a material made of particles having a cubic structure with an edge of the same length as the axes of the hexagonal crystal, in a random distribution. The overall contact of the resistance-determining component determines the resistance value. In this case the resistance value will therefore be low, which means that a relatively small quantity of the rhodate is necessary to form a resistor body having a certain resistance value.

As mentioned above, it is possible to form resistor bodies having a low TCR value by using a $Bi_xSr_{1-x}Rh_{2.5}O_{5\text{-}5.5}$ compound in combination with a resistance-determining component which has a negative linear TCR.

In one embodiment of the invention, a metal rhodate $M_3Rh_7O_{15}$, wherein M is preferably Pb or Sr, is used, for this purpose, as described in the above-mentioned Patent. Our copending patent application Ser. No. 127,347, which was filed on the same date as the present patent application, relates to a resistance material containing a resistance-determining material which may be a Bi—Sr rhodate having a different structure and a different composition from the $Bi_xSr_{1-x}Rh_{2.5}O_{5\text{-}5.5}$ of the present invention. These materials, the composition of which is defined by the formula $Bi_xSr_{1-x}Rh_2O_{4\text{-}4.5}$ wherein $\frac{1}{2}>x>0$, have acicular crystals having an a-axis of 20.2 Å and a c-axis of 3.1 Å and have negative, linear TCR's. These resistance-determining materials can of course be incorporated into resistance materials according to the present invention.

A resistor body can be produced from a resistance-material according to the invention by heating a substrate bearing the resistance-material so as to remove the temporary binder and form a coherent resistive layer. The temporary binder is volatilized and/or decomposed by heating and the permanent binder provides cohesion of the layer by melting, softening or sintering. The permanent binder is, preferably, a low-melting glass, but may also be a synthetic resin.

DESCRIPTION OF THE PREFERRED EMBODIMENTS

The invention will now be further described with reference to the following examples.

Bismuth-strontium rhodate $Bi_xSr_{1-x}Rh_{2.5}O_{5\text{-}5.5}$ was prepared by heating a mixture of $Bi_2O_3$, $SrCl_2$ and $Rh_2O_3$ in a molar ratio 1:9:2 in air for 2 hours at a temperature of 1000° C. The excess Bi and Sr-compounds were dissolved in $HNO_3$. The reaction product obtained consisted of acicular particles, approximately 10 μm long and 0.1 μm in diameter. The specific surface area of the powder was then approximately 8 $m^2/g$.

The value of x in this composition was 0.22. Bismuth strontium rhodate $Bi_xSr_{1-x}Rh_2O_{4\text{-}4.5}$ having an acicular structure (a=20.2 Å and c=3.1 Å) was obtained by heating a similar mixture, however in a molar ratio of 3:9:2 for 3 hours in air at a temperature of 1050° C. After cooling, the unreacted compounds were dissolved in $HNO_3$. For this composition the value of x in the formula was 0.30.

Mixtures of the first-mentioned powder were mixed in different ratios with a glass powder having an average particle size of 10 μm and with $Bi_{0.30}Sr_{0.70}Rh_2O_{4-4.5}$ powder and thereafter processed into pastes by the addition of benzyl benzoate and ethyl cellulose.

The glass powder used had the following composition, expressed in % by weight:

| | |
|---|---|
| PbO | 36.0 |
| $SiO_2$ | 20.6 |
| $B_2O_3$ | 5.0 |
| $Al_2O_3$ | 2.4 |
| $Bi_2O_3$ | 36.0. |

The pastes were spread onto sintered alumina plates and the paste layers were then dried in air. The plates bearing the dried paste layers were fired in air for 15 minutes. The layers obtained were approximately 15 μm thick after firing.

The following table shows some compositions of resistance materials, the temporary binder content being omitted, together with the firing temperature used, the resistance per square and the TCR of the fired layers.

| Example No. | wt. % glass | Resistance determining component (wt. %) | firing temp. (°C.) | R□ (Ohms/ | TCR $10^{-6}$/°C. |
|---|---|---|---|---|---|
| 1 | 50 | BiSr rhodate ($MRh_{2.5}O_{5-5.5}$): BiSr rhodate ($MRh_2O_{4-4.5}$ 1:4 | 700 | 45 | +70 |
| 2 | 50 | BiSr rhodate $MRh_{2.5}O_{5-5.5}$): BiSr rhodate ($MRh_2O_{4-4.5}$) 1:8 | 700 | 65 | −70 |
| 3 | 50 | BiSr rhodate ($MRh_{2.5}O_{5-5.5}$) | 700 | 15 | +700 |
| 4 | 75 | BiSr rhodate ($MRh_{2.5}O_{5-5.5}$): $Pb_3Rh_7O_{15}$ 1:2 | 750 | 150 | −20 |

What is claimed is:

1. A resistance material comprising a bismuth-strontium rhodate compound having a composition defined by the formula $Bi_xSr_{1-x}Rh_{2.5}O_{5-5.5}$, wherein x is between 0 and ½.

2. A resistance material as claimed in claim 1, wherein x is between 0.05 and 0.45.

3. A resistor having a resistor body provided with leads, said resistor body comprising the resistance material of claim 1 or 2.

4. A resistance material comprising a mixture of a permanent binder, a temporary binder and a resistance-determining component, said resistance-determining component comprising a bismuth-strontium rhodate having a composition defined by the formula $Bi_xSr_{1-x}Rh_{2.5}O_{5-5.5}$, wherein x is between 0 and ½.

5. A resistance material as claimed in claim 4, wherein x is between 0.05 and 0.45.

6. A resistance material as claimed in claim 1, 2, 4 or 5, further comprising a resistance-determining component having a negative temperature coefficient of resistance.

7. A resistance material as claimed in claim 6, wherein the resistance-determining component having a negative temperature coefficient of resistance is a metal rhodate having a composition defined by the formula $M_3Rh_7O_{15}$, wherein M is Pb or Sr.

8. A resistance material as claimed in claim 6, wherein the resistance-determining component having a negative temperature coefficient of resistance is a metal rhodate having a composition defined by the formula $Bi_xSr_{1-x}Rh_2O_{4-4.5}$, wherein x is between 0 and ½.

9. A resistor having a resistor body provided with leads, said resistor body comprising a substrate bearing a resistance material as claimed in claim 4 or 5, said resistor body having been produced by heating the substrate and resistance material so as to remove the temporary binder and form a coherent resistive layer.

* * * * *

UNITED STATES PATENT AND TRADEMARK OFFICE
CERTIFICATE OF CORRECTION

PATENT NO. : 4,302,042

DATED : November 24, 1981

INVENTOR(S) : Thomas P. Kerr et al.

It is certified that error appears in the above-identified patent and that said Letters Patent are hereby corrected as shown below:

Column 6, Claim 1, line 31, delete "supporting" and insert --support--;

Column 8, Claim 5, line 6, delete "to" and insert --of--.

Signed and Sealed this

*Sixteenth* Day of *February 1982*

[SEAL]

*Attest:*

GERALD J. MOSSINGHOFF

*Attesting Officer* *Commissioner of Patents and Trademarks*